United States Patent Office 3,753,850
Patented Aug. 21, 1973

3,753,850
GOLD TOOLING PROCESS AND LAMINATE THEREFOR
Jacques Brunet, Lyon, France, assignor to
La Cellophane, Paris, France
No Drawing. Filed Mar. 14, 1972, Ser. No. 234,680
Claims priority, application France, May 6, 1971,
7116329
Int. Cl. B32b 7/06, 31/20; B44c 1/16
U.S. Cl. 161—214                                                    11 Claims

ABSTRACT OF THE DISCLOSURE

A process for transferring metals by a tooling method which comprises placing a metal-coated laminate on a substrate to be decorated, this metal laminate comprising a temporary support, a non-adherent and protective layer on the support, the layer comprising a polyester having a melting point below 150° C. formed by the polycondensation of saturated linear dicarboxylic acids and alkylene diols having from 2–6 carbon atoms, a thin film of a decorative metal on this non-adherent and protective layer and a layer of a heat-activated glue on the metal; transferring a portion of this metal layer corresponding to the pattern on a heat-setting iron to the substrate to be decorated and removing the metal-coated laminate leaving a metal tooled pattern on the substrate.

---

This invention relates to a process for transferring a portion of a metal film to a substrate by a tooling process. More particularly, this invention relates to an improved non-adherent and protective coating for use in transferring metal films by a tooling process.

Gold tooling processes are used to make attractive articles, such as book bindings and other decorative articles, by depositing metal films in intricate designs on various substrates, such as paper, cardboard, leather, plastics and similar materials by utilizing a hot-press or iron with a die having the pattern or inscription to be reproduced. Generally, the materials utilized for transferring the metal or gold to the final substrate comprise a support layer, an anti-adherent coating layer, a varnish or protective layer, a metal layer, and a glue layer.

While the process for transferring metal designs utilizing gold tooling is simple and well known, there are a number of difficulties and problems due to the necessity of combining various materials which must perform their various individual functions while, at the same time, must be compatible with one another. In order to produce a satisfactory final product, the inscription must adhere smoothly and firmly to the final substrate and form a sharp and clearly defined impression. Furthermore, the metal and protective varnish should be fully removed from the temporary support subsequent to the impression with the hot transferring iron and the resulting inscription must firmly adhere to the final substrate and not have any ripples, bubbles, or discontinuities.

The protective layer should be sufficiently transparent, although it may be colored, so that the metal layer beneath is visible. Furthermore, this protective layer should be sufficiently adherent to the metal layer and be compatible with the non-adherent or anti-adherent layer utilized. The anti-adherent layer must join the temporary substrate and the protective layer and metal film before use and allow the protective layer and the metal film to be removed upon treatment with the hot iron. The anti-adherent layer must be sufficiently compatible with the protective layer so that no interaction between these layers, either during storage or during use, occurs.

It is quite difficult to develop a laminate for use in gold tooling which has the various properties necessary for the protective and anti-adherent layers while, at the same time, has the compatibilty between these layers. Therefore, it has been proposed to utilize a single layer as the anti-adherent and protective layer; however, prior single layers developed for this purpose, such as mixtures of waxes and nitrocellulose or acrylic varnishes or silicones, are complex and costly and are not completely satisfactory since, either they are not transparent enough and dull the metal or they adhere too firmly to the metal film and do not form a clean cut when the hot iron is applied and the temporary support is removed.

It is within the above environment that the process and product of the present invention were developed. Briefly, the process of the present invention comprises placing a metal film containing laminate on top of a final substrate, the laminate comprising a temporary support, a protective and anti-adherent layer, a metal film and a glue layer; the protective and anti-adherent layer comprising a polyester having a melting point below 150° C. formed by the polycondensation of saturated linear dicarboxylic acids and alkylene diols having from 2–6 carbon atoms; applying a hot-tooling iron to this metal laminate and removing the temporary support layer from the final substrate. The novel laminate of the present invention for use in transferring metal films by the heat-tooling technique comprises a temporary substrate, an anti-adherent and protective layer comprising a polyester having a melting point below 150° C. produced by a polycondensation of linear saturated dicarboxylic acids and alkylene diols having from 2–6 carbon atoms, a metal film and a heat-sealable glue.

It is, therefore, a primary object of the present invention to provide an improved process for producing metal toolings on various substrates.

It is a further object of the present invention to provide an improved process for producing metal toolings on various substrates utilizing a single protective and anti-adherent layer which comprises a polyester having a melting point below 150° C.

It is a still further object of the present invention to provide a novel laminate for use in producing a metal tooling on substrates utilizing a protective and anti-adherent layer comprising a polyester having a melting point below 150° C.

It is a still further object of the present invention to provide a metal laminate for use in producing gold tooling wherein the design or image produced is sharp and clear and firmly adherent to the final substrate.

Still further objects and advantages of the process and product of the present invention will become more apparent from the following more detailed description thereof.

The process of the present invention comprises placing a metal-like containing laminate on top of a final permanent support, such as paper, cardboard, leather, plastics, etc., the metal film containing laminate comprising a heat-activated glue layer, this glue layer being placed next to the permanent support, a thin layer of the metal to be deposited on top of the glue layer, an anti-adherent and protective layer on top of the metal layer, this anti-adherent layer comprising a polyester having a melting point below 150° C. produced from the polycondensation of linear saturated dicarboxylic acids and alkylene glycols having from 2–6 carbon atoms and a temporary support layer placed on top of the protective and anti-adherent layer; transferring the glue layer, metal layer and protective and anti-adherent layers to the final substrate by contacting the temporary support layer with a hot iron having a die with a pre-determined design; and, finally, removing the temporary support layer to expose the final metal tooled design on the final support.

The product of the present invention comprises a temporary support layer, a protective and anti-adherent layer comprising a polyester having a melting point below 150° C. formed from the polycondensaiton of linear saturated dicarboxylic acids and alkylene diols having from 2–6 carbon atoms, a thin layer of a decorative metal and a thermally activated glue.

As the temporary support layer in the laminate of the present invention, any support film or material generally utilized having temporary supports in gold tooling laminates can be utilized. However, it has been found that the following support films are especially compatible with the protective and anti-adherent layer utilized in the present invention: polyethylene films, polypropylene films, polyvinyl chloride films, various polyester films, cellulose films and various plastic coated papers, etc. The above temporary supports are especially well suited for use in the product of the present invention since the polyester anti-adherent materials are particularly non-adherent to these base materials.

Furthermore, with regard to the heat-activated glues utilized to firmly and finally adhere the metal tooled layer to the final substrate, it has been found that any of the glues, such as acrylic and vinyl resins, which are generally employed as glues in these products are suitable.

Furthermore, the metal film layer which is the decorative layer in the process and product of the present invention may be any typical metal which can be deposited in a thin film on such protective and anti-adherent layer by such well known metal-coating processes, as vacuum deposition. The metals suitable for use in this metal-coating layer include gold, copper, zinc, silver and aluminum. Since aluminum is the most economical metal of the above noted materials, it is most often utilized mixed with a small amount of pigment so as to resemble the other materials. Generally, the metals are deposited on the polyester layer as thin films within the range of from 0.3 micron to 15 microns thick depending both on the cost of the metal and the desired effect.

The single anti-adherent and protective layer utilized in the laminate of the present invention and the process for forming metal tooled products comprises a polyester having a melting point below 150° C. Generally, these polyesters are formed by the polycondensation of saturated linear dicarboxylic acids and alkylene diols having from 2–6 carbon atoms. These materials have been found to be anti-adherent at the usual temperatures of metal tooling, i.e., from 100–140° C., and especially anti-adherent with respect to the above noted support materials. Furthermore, these materials adhere strongly to the metal-coating and are easily coated with metal under vacuum. Furthermore, these materials are quite compatible with the glues generally utilized for applying the metal tooling to the base.

Suitable linear dicarboxylic acids for use in the protective and anti-adherent layer in the present invention include dicarboxylic acids and anhydrides of these acids: adipic acid, azelaic acid, sebacic acid, etc. The preferred linear saturated dicarboxylic acid for use in the process and product of the present invention is sebacic acid.

The glycols suitable for use in forming the polyester anti-adherent and protective layer of the present invention comprise ethylene glycol, propylene glycol, butylene glycol, tetramethylene glycol, neopentyl glycol, α-n-amylene glycol, pentamethylene glycol, γ-pentylene glycol, hexanediol, etc. Although any of the above noted glycols may be utilized, ethylene glycol, butylene glycol and neopentyl glycol are preferred.

The polyesters utilized as the protective and anti-adherent coating in the process and product of the present invention generally are relatively low molecular weight polyesters and generally may be either homopolymers formed by reacting the above noted dicarboxylic acids and glycols or copolymers of the above noted materials.

These polyester resins are not film forming and it is this property which is beneficial in the process and product of the present invention since these materials provide a very clean cut of the inscription formed by the heated iron or die.

These polyester resins utilized as protective and anti-adherent varnishes for gold tooling are known resins and may be prepared utilizing any of a number of standard procedures.

These resins are often available in granular form and can be utilized by dissolving these materials in a solution of organic solvents, such as trichloroethylene, benzene, toluene, methyl ethyl ketone, etc. to form varnishes as long as the organic solvent is compatible with the temporary support material utilized. The usual concentration of the resin in these coating varnishes is in the order of 10% by weight. At this concentration, both the anti-adherent character and the protective character of the varnish is obtained; however, should the anti-adherent character alone be desired, the concentration can be reduced to 2–3% by weight. The solution varnishes can be coated according to any well known process for coating varnishes and solution, such as by doctor blades and coating rollers at a temperature in the order of about 40° C. Subsequent to the coating of the temporary support, the coated film is then dried utilizing conventional processes at a temperature between 80° and 100° C. to remove the solvent carrier.

The polyester coatings can also be applied in the molten state utilizing hot-metal processes at temperatures around 110° C. or at higher temperatures if a smaller amount of coating is desired. Generally, these hot-melt techniques utilize a meniscus process wherein the film to be coated tangentially passes over a roller along which a meniscus is formed by contact with the latter or by calendering or other known hot-melt processes. When the polyesters are applied in a molten state, the coating may be allowed to cool by placing the same in ambient temperatures without any drying of the coating.

As noted above, the polyesters utilized as the varnishes in accordance with the present invention have both anti-adherent and protective properties. In order to assure that the polyester provides both of the above noted properties, at least 1 g./m.$^2$ of polyester should be deposited on the temporary substrate. The protection provided by the polyester varnish layer can be increased by depositing a slightly thicker layer on the temporary support up to about 4 g./m.$^2$ depending upon the final use of the tooling product.

Although the polyesters utilized as the anti-adherent and protective coating possess both of these properties, it is also possible to utilize the polyester varnishes as the anti-adherent coating only in association with usual protective varnishes which only adhere slightly to the polyesters, for example, nitrocellulose varnishes. When the polyester varnishes are utilized only as anti-adherent varnishes, the amount of material in the layer can be considerably reduced and a coating in the neighborhood of about 0.3/m.$^2$ dry material is sufficient.

The polyester varnishes are compatible with various plasticizers, fillers, pigments, dyes and other materials which may be added to these anti-adherent and protective layers. More particularly, this is true with respect to pigments or dyes which are utilized to modify the final appearance of the metal-coated layers.

The primary advantages of the polyester varnishes utilized in the process and product of the present invention lies in their excellent transparency. Although the polyesters themselves are inherently transparent, this transparency should not be altered by surface irregularities or waves which may occur during coating. Therefore, it is advisable to supplement the coating processes by a smoothing treatment, such as a calendering treatment performed subsequent to the coating of the substrate with the polyester varnishes at a temperature in the order of 100° C.

Also, when the films are deposited by hot-melt coating methods, the smoothing may be conducted by utilizing rods or by reheating the films in an oven to even the coating.

The dies generally used for producing the gold tooling in accordance with the process of the present invention are conventional and may include heating irons generally used for this purpose. These dies generally exert a pressure in the order of 2 g./cm.$^2$ at various temperatures depending upon the nature of the temporary support, the final supporting material, the heat-sealable layer and other parameters. However, these temperatures generally are in the order of 120° C. and generally between 100° C. and 140° C.

The process and product of the present invention will now be more fully illustrated by way of the following specific examples which are for the purpose of illustration only and are to be in no way considered as limiting. In the following examples, all temperatures are in degrees centigrade, and all parts and percentages are by weight.

EXAMPLE 1

A 10% solution of a polyethylene glycol sebacate having a melting point of 95° C. in trichloroethylene is used to coat a polyester film 12 microns thick. The coating solution is kept at 40° C. and is deposited on the polyester film by means of a rotating metal roller which skims the surface of the polyester solution which is deposited on the film travelling at a rate of 10 m./min. in the same direction as the rotation of the roller. The speed of the film is regulated with relation to the roller speed so that the height of the meniscus formed corresponds to a deposition of 1.5 g./m.$^2$ of polyester solids on the polyester film.

The film then passes into a drying oven, three meters long, at a temperature of 100° C. and is then calendered on a polished roller at 50° C. and wound. The film is then metal-coated by condensation under vacuum with an aluminum layer, 0.4 micron thick, followed by a coating of the metal layer with a layer of heat setting acrylic resin glue.

This film is then utilized to gold tool leather with a design having a series of descriptions in fine letters. The transfer is made without any pasting and the inscription is perfectly legible and protected by a stable transparent varnish.

EXAMPLE 2

A polyethylene glycol sebacate having a molecular weight of 2500 and a melting point of approximately 100° C. is heated to a temperature of 130° C. in a melting pot so that the polyester has a viscosity of approximately 6 poises. This melted polymer is then deposited on a polyester film, 12 microns thick, using a metal soaking roller having a temperature of 140° C. heated by the internal circulation of oil. The melted polyester is deposited on the metal cylinder utilizing a rubber-coated pressing roller turning in the same direction and at the same speed as the metal-coated roller, the pressure of the rubber-coated roller being adjusted so that the polyester melt is deposited on the polyester film at about 1.2 g./m.$^2$ while the speed of the polyester support film is 10 m./min. After cooling at 25° C., the coated film is calendered on a polished cylinder at a temperature of 50° C. This product is then vacuum-coated with aluminum followed by a coating with a layer of an acrylic resin glue and utilized to transfer by gold tooling onto paper with similar results.

EXAMPLE 3

Utilizing the procedure of Example 2, a polyester film, 23 microns thick, is coated with a polybutyl adipate which has been heated to 90° C. in a boiler. This film is coated by contact with a roller kept at 110° C. with a pressure of the rubber-coated roller being such that the deposit of the polyester melt is approximately 1 g./m.$^2$. After a coating of aluminum is applied and the metal-coated film is coated with a vinyl glue, the support is utilized for gold tooling on cardboard supports. The detail in the gold tooling is clearly transferred and the coated patterns protected by a transparent varnish which assures lasting protection.

EXAMPLE 4

Utilizing the procedure of Example 2, a polyvinyl chloride film, 20 microns thick, is coated with a polyneopentyl azelate melted below 150° C. This material is then coated with a vacuum deposition of gold, 0.4 micron thick, followed by coating with a vinyl glue. This material when utilized for gold tooling, produces an excellent and finely detailed inscription on leather.

While the process and product of the present invention have been illustrated by way of the foregoing specific examples, the same are to be in no way limited thereto but are to be construed as broadly as any and all equivalent in the following claims.

What is claimed is:

1. In a process for gold tooling comprising placing a metal-coated laminate on a final substrate to be decorated, said laminate comprising a temporary support, a non-adherent and protective layer on said support, a thin film of a metal and a coating of a heat-activated glue, transferring a portion of said metal film corresponding to a pattern on a heat-sealing iron and removing said metal-coated laminate leaving a metal tooled pattern on said final substrate, the improvement which comprises said non-adherent and protective layer comprising a polyester having a melting point below 150° C. formed by the polycondensation of saturated linear dicarboxylic acids and alkylene diols having from 2–6 carbon atoms.

2. The process of claim 1 wherein said polyesters are formed by the polycondensation of saturated linear dicarboxylic acids selected from a group consisting of adipic acid, azelaic acid and sebacic acid and an alkylene diol having from 2–6 carbon atoms.

3. The process of claim 2 wherein the heat-sealing iron is kept at a temperature within the range of from 100–140° C.

4. The process of claim 2 wherein the polyester is formed by the polycondensation of ethylene glycol and sebacic acid.

5. The process of claim 2 wherein the temporary support is a polyethylene film, polypropylene film, polyvinyl chloride film, cellulose film, or polyester film.

6. The process of claim 2 wherein the non-adherent and protective layer comprises from between 0.3–4 g./m.$^2$ polyester.

7. A laminate for use in producing inscriptions by a gold tooling technique comprising a temporary support layer, a non-adherent and protective layer over said temporary support layer, said non-adherent and protective layer comprising a polyester having a melting point below 150° C. formed from the polycondensation of saturated linear dicarboxylic acids and alkylene diols having from 2–6 carbon atoms, a thin film of a metal coated on said non-adherent and protective layer so that said non-adherent and protective layer is between said metal film and said temporary support and a heat-activated glue layer coated on said metal film on a side of said metal film away from said protective and non-adherent layer.

8. The laminate of claim 7 wherein said polyesters formed by the polycondensation of saturated linear dicarboxylic acids selected from a group consisting of adipic acid, azelaic acid, and sebacic acid and an alkylene diol having from 2–6 carbon atoms.

9. The laminate of claim 8 wherein the polyester is formed by the polycondensation of ethylene glycol and sebacic acid.

10. The laminate of claim 8 wherein the temporary support is a polyethylene film, polypropylene film, polyvinyl chloride film, cellulose film, or polyester film.

11. The laminate of claim 8 wherein the non-adherent and protective layer comprises from between 0.3–4 g./m.² polyester.

References Cited
UNITED STATES PATENTS

| | | | |
|---|---|---|---|
| 3,340,121 | 9/1967 | Lawrenz | 156—233 |
| 2,644,262 | 7/1953 | Schoenberg | 156—233 |
| 3,152,950 | 10/1964 | Palmquist et al. | 161—214 |
| 1,124,869 | 1/1915 | Davis et al. | 156—234 X |
| 2,597,396 | 5/1952 | Squires | 156—233 |
| 2,635,974 | 4/1953 | Terry | 161—214 |
| 3,308,004 | 3/1967 | Rouault | 161—214 X |
| 3,046,174 | 7/1962 | Brooks et al. | 161—214 X |
| 3,692,610 | 9/1972 | Kornstein | 161—406 |

HAROLD ANSHER, Primary Examiner

U.S. Cl. X.R.

156—233, 234; 161—216